(12) United States Patent
Itoh

(10) Patent No.: US 7,095,525 B2
(45) Date of Patent: Aug. 22, 2006

(54) IMAGE PROCESSING APPARATUS AND IMAGE PROCESSING METHOD

(75) Inventor: Hirohiko Itoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 10/892,084

(22) Filed: Jul. 16, 2004

(65) Prior Publication Data

US 2004/0252320 A1 Dec. 16, 2004

Related U.S. Application Data

(60) Division of application No. 09/322,177, filed on May 28, 1999, now Pat. No. 6,963,410, which is a continuation of application No. 08/528,423, filed on Sep. 14, 1995, now Pat. No. 5,923,437.

(30) Foreign Application Priority Data

Sep. 30, 1994 (JP) .................................. 6-261221

(51) Int. Cl.
*G06F 15/00* (2006.01)

(52) U.S. Cl. ...................................... 358/1.16; 358/1.1

(58) Field of Classification Search ............... 358/1.18, 358/1.12, 1.13, 296, 401, 444, 1.16, 1.1
See application file for complete search history.

(56) References Cited

U.S. PATENT DOCUMENTS

| | | | |
|---|---|---|---|
| 4,705,393 A | 11/1987 | Ito | 355/14 |
| 4,719,516 A | 1/1988 | Nagashima | 358/444 |
| 4,963,932 A | 10/1990 | Horvath | 399/185 |
| 4,975,738 A | 12/1990 | Senma et al. | 355/77 |
| 4,990,941 A | 2/1991 | Kawai | 346/153.1 |
| 4,990,954 A | 2/1991 | Higashio et al. | 399/83 |
| 5,043,762 A | 8/1991 | Iwaki et al. | 399/81 |
| 5,091,746 A | 2/1992 | Watanabe | 355/202 |
| 5,175,632 A | 12/1992 | Hayashi et al. | 358/401 |
| 5,200,830 A | 4/1993 | Imaizumi et al. | 358/296 |
| 5,206,735 A | 4/1993 | Gauronski et al. | 358/296 |
| 5,257,115 A | 10/1993 | Takayanagi | 358/43 |
| 5,260,742 A | 11/1993 | Kikkawa | 393/83 |
| 5,262,851 A | 11/1993 | Nakatani et al. | 358/500 |
| 5,270,775 A | 12/1993 | Suzuki | 355/204 |
| 5,285,723 A | 2/1994 | Ichikawa et al. | 101/35 |
| 5,287,203 A | 2/1994 | Namizuka | 358/443 |
| 5,349,448 A | 9/1994 | Hirai | 358/444 |
| 5,377,016 A | 12/1994 | Kashiwagi et al. | 358/403 |
| 5,506,692 A | 4/1996 | Murata | 358/442 |
| 5,815,280 A | 9/1998 | Ohmura et al. | 358/296 |
| 5,923,437 A | 7/1999 | Itoh | 358/401 |
| 6,963,410 B1 * | 11/2005 | Itoh | 358/1.13 |

FOREIGN PATENT DOCUMENTS

JP          56-164673         12/1981

(Continued)

*Primary Examiner*—Twyler Lamb
*Assistant Examiner*—Alan Rahimi
(74) *Attorney, Agent, or Firm*—Fitzpatrick, Cella, Harper & Scinto

(57) ABSTRACT

When reading image data stored on a detachable storage medium such as a magneto-optical disk and outputting the data using an image outputting device, data regarding modes in which the image data is to be output is stored in advance on a storage medium by an apparatus such as a personal computer, for example, which is different from the image outputting device. By loading the storage medium in the image outputting apparatus, the image data is read out and output in accordance with the stored output mode data, whereby it is possible to prevent the image outputting apparatus from being monopolized for a long period of time and to output data easily in a desired output mode.

15 Claims, 9 Drawing Sheets

FOREIGN PATENT DOCUMENTS

| | | |
|---|---|---|
| JP | 59-223463 | 12/1984 |
| JP | 1-200875 | 8/1989 |
| JP | 4-218873 | 8/1992 |
| JP | 4-256971 | 9/1992 |
| JP | 5-233166 | 9/1993 |

* cited by examiner

FIG. 5

DOCUMENT NUMBER:3   NAME OF DOCUMENT:MINUTES   NUMBER OF PAGES:10

<DESIGNATE OUTPUT MODE>

NUMBER OF COPIES

NUMBER OF PAGES    ⦿ ALL
                   ○ FROM [ ] TO [ ]

PAPER SIZE         ⦿ AUTO
                   ○ [A4]

DOUBLE-SIDED PRINTING   ⦿ DESIRED
                        ○ UNDESIRED

SORTING    ⦿ DESIRED
           ○ UNDESIRED

STAPLING   ⦿ DESIRED
           ○ UNDESIRED

FIG. 6

NUMBER OF JOBS REGISTERED:3    NUMBER OF JOBS UNPROCESSED:3

| JOB NO. | DOC. NO. | NAME OF DOC. | NO. OF PAGES | RANGE OF PAGES | NO. OF COPIES | PAPER SIZE | PAPER DIRECTION | DOUBLE-SIDED PRINTING | SORTING | STAPLING | REG. DATE/TIME | EXEC. DATE/TIME | STATUS |
|---|---|---|---|---|---|---|---|---|---|---|---|---|---|
| 1 | 3 | MINUTES | 10 | 1~10 | 5 | AUTO | AUTO | DESIRED | DESIRED | DESIRED | '93-3-25 10:00 | — | UNPROCESSED |
| 2 | 4 | LIST | 5 | 1~1 | 2 | AUTO | AUTO | UNDESIRED | DESIRED | DESIRED | '93-3-25 10:03 | — | UNPROCESSED |
| 3 | 7 | CATALOG | 1 | 1~1 | 1 | AUTO | AUTO | UNDESIRED | DESIRED | UNDESIRED | '93-3-25 10:04 | — | UNPROCESSED |
| ..... | ..... | ..... | ..... | ..... | ..... | ..... | ..... | ..... | ..... | ..... | ..... | ..... | ..... |

[CHANGE]   [OK]

IMAGE PROCESSING APPARATUS AND IMAGE PROCESSING METHOD

This application is a division of application Ser. No. 09/322,177, filed on May 28, 1999, now U.S. Pat. No. 6,963,410, which is a continuation of application Ser. No. 08/528,423 filed on Sep. 14, 1995, now U.S. Pat. No. 5,923,437 issued Jul. 13, 1999.

BACKGROUND OF THE INVENTION

1. Field of the Invention

The present invention relates to an image processing apparatus and an image processing method for processing image data and, in particular, to an image processing apparatus and an image processing method that allow image data to be output in a desired mode.

2. Description of the Related Art

An electronic image filing apparatus has been known which stores input image data as files in a memory that is capable of electrical storage, making it possible for the image data to be managed in files.

Conventional electronic image filing apparatuses, used, for example, on a stand-alone basis, are comprised of a scanner for reading original document images, a printer for outputting image data onto recording paper or the like for recording, a display for visibly displaying images, a controller for controlling various processings, and a storage device for storing image data in the form of files.

Recently, a compound system has been put into practical use which can be utilized as a facsimile apparatus by using the scanner and printer of a digital copying machine and, further, a modem or the like, or which develops coded data from a computer into bit map data that can be printed out by using the printer section of a digital copying machine and an interface or the like for connection to the computer.

As described in a U.S. patent application filed by the present applicant, application Ser. No. 07/957,092 filed Oct. 6, 1992, such compound systems are increasing in added values. For example, a system having a plurality of functions, such as a copying function, a facsimile function, a printer formatter function, an electronic image filing function, and an image memory function, is formed as a single unit.

In such a compound system, a scanner section and a printer section are shared by these functions, whereas, in ordinary separate systems, each of the above-mentioned functions requires its own scanner section and printer section. Thus, such a compound system helps to achieve a reduction in space and cost, advancement in performance, etc.

In some conventional copying machines, the sorting or stapling of copies of documents is performed by using a sorter or a staple sorter.

When the image data of a desired file is read from a storage device and output to recording paper by a printer, it is possible for the data to be output in a sorted or stapled form by setting a desired output mode, such as a sorting mode or a stapling mode, at the operating section, the output being effected in the designated mode.

However, when manipulating the operating section to set the desired output mode, other users cannot use the apparatus while the setting operation is being performed. That is, the apparatus is monopolized during that time by the user who is performing the setting operation.

SUMMARY OF THE INVENTION

The present invention has been made in view of the above problem in the prior art. It is an object of the present invention to provide an image processing apparatus and an image processing method which help prevent the apparatus from being monopolized for a long period of time and which make it possible for image data to be output in a desired output mode.

Another object of the present invention is to make it possible for the outputting of image data in a desired mode to be effected by a simple operation.

A third object of the present invention is to distribute the processings related to the outputting of image data among other devices.

To achieve the above-noted objects, in a first aspect, the present invention provides an image processing apparatus comprising input means for inputting image data, image storage means for storing the image data input by the input means on a detachable storage medium and output means for outputting image data stored in the image storage means in an output mode, in accordance with output mode data stored on the storage medium by another apparatus, in correspondence with the image data. The output means outputs the image data in an output mode corresponding to the output mode data, without any designation from the image processing apparatus.

To achieve the above-noted objects, in a second aspect, the present invention provides an image processing apparatus comprising detection means for detecting whether a detachable storage medium, on which image data and output mode data corresponding to the image data are stored, has been loaded, and output means for outputting image data corresponding to the output mode data stored on the storage medium in an output mode corresponding to the output mode data when the detection means detects that the storage medium has been loaded.

To achieve the above-noted objects, in yet another aspect, the present invention provides an image processing method comprising steps of (a) storing image data on a detachable storage medium using image data output apparatus, (b) storing output mode data for outputting the image data stored in step (a), in correspondence with the image data, using apparatus that is different from the image data output apparatus, (c) loading the storage medium in the image data output apparatus and (d) outputting the image data to be output in the output mode stored in step (b) without any designation from the image data output apparatus.

The above and further objects of the present invention will become apparent from the following detailed description with reference to the drawings.

BRIEF DESCRIPTION OF THE DRAWINGS

FIG. 5 is an explanatory diagram showing an output mode designation with respect to an output job file in the first embodiment;

FIG. 6 is an explanatory diagram showing the contents of an image output job file in the first embodiment;

DETAILED DESCRIPTION OF THE PREFERRED EMBODIMENTS

An embodiment of the present invention will now be described in detail with reference to the drawings.

Figure 1:
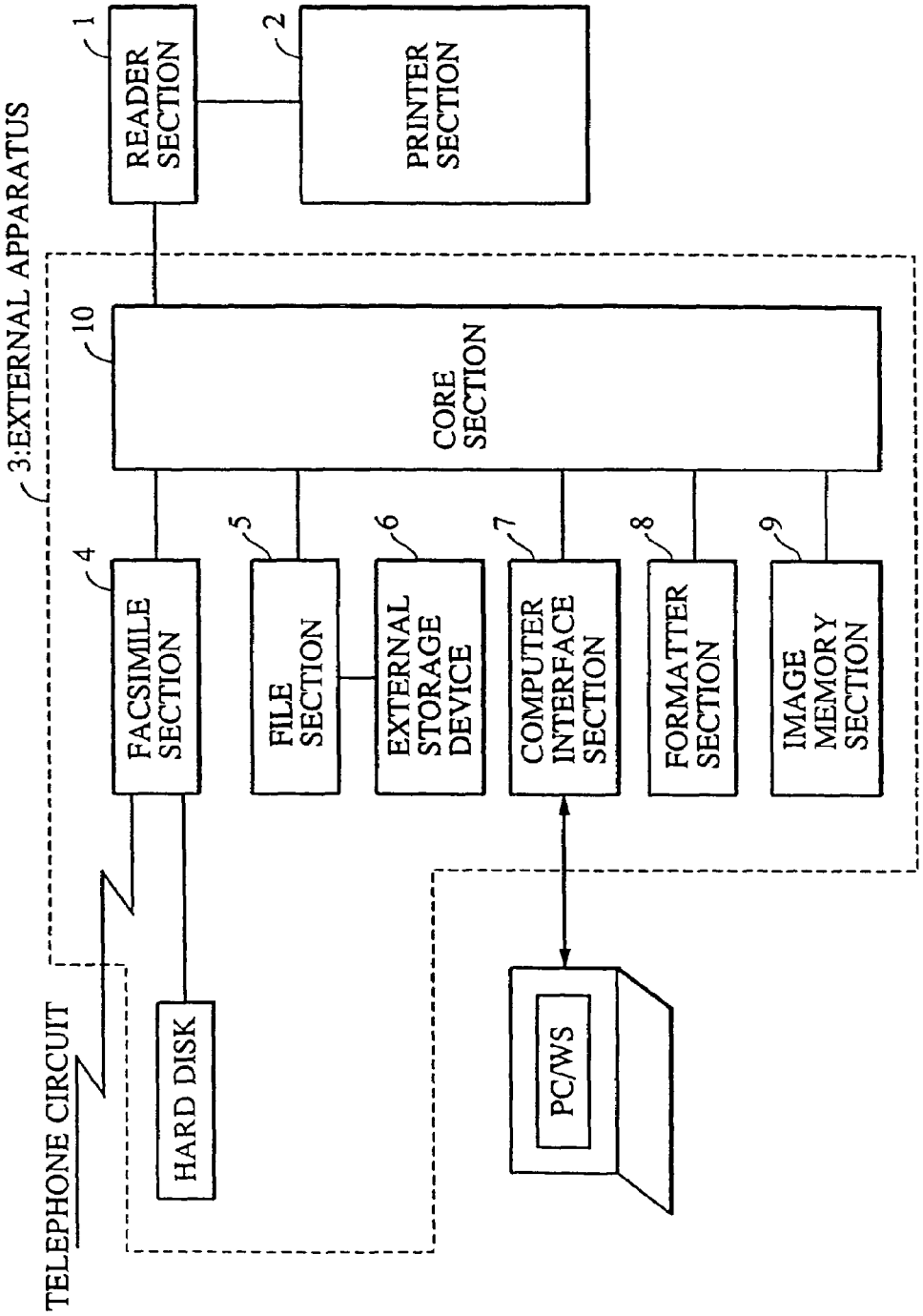
FIG. 1 is a block diagram showing the control system of a compound apparatus according to a first embodiment of the present invention.

FIG. 1 is a block diagram showing the system configuration of a compound image input/output apparatus combining a plurality of functions.

In FIG. 1, a reader section 1 is an image input device for reading the images of originals to output image data. A printer section 2 is an image output device which has cassettes for a plurality of kinds of recording paper and which prints out image data on recording paper as visual images in response to a print command.

An external apparatus 3 is electrically connected to the reader section 1 and has various functions. That is, the external apparatus 3 includes a facsimile section 4, a file section 5, an external storage device 6 connected to the file section 5, a computer interface section 7 for connection to a computer, a formatter section 8 for converting information transmitted from the computer into visual images, an image memory section 9 for temporarily storing information transmitted from the computer, a core section 10 for controlling the above functions, etc.

Figure 2:
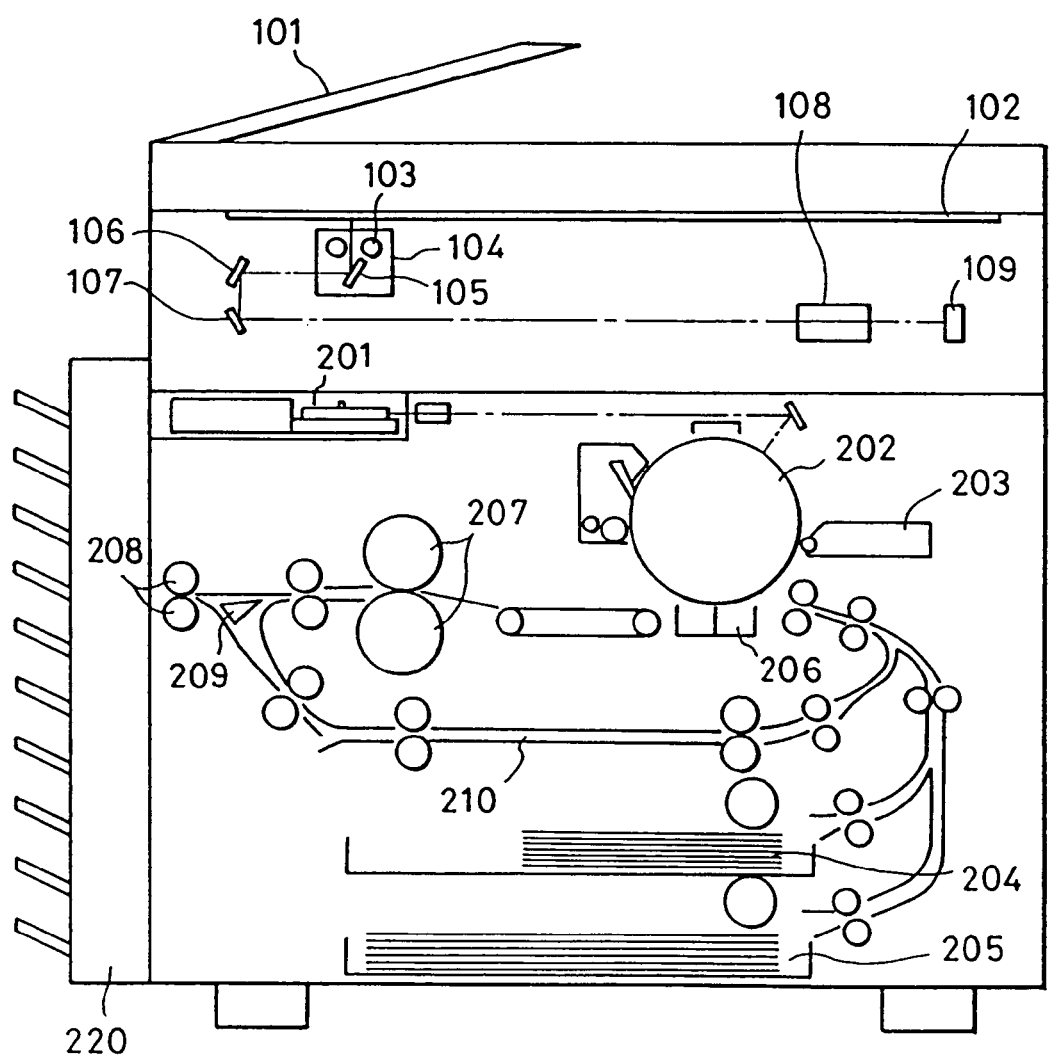
FIG. 2 is a sectional view showing the construction of the compound device of the first embodiment.

FIG. 2 is a sectional view showing the construction of the reader section 1 and that of the printer section 2.

First, documents stacked on a document feeding device 101 are conveyed one by one onto a glass plate 102 constituting a document tray. When a document is brought to a predetermined position on the glass plate 102, a lamp 103 of the scanner section comes on, and a scanner unit 104 moves to expose and scan the document. The reflected light from the document is transmitted via mirrors 105, 106 and 107 and a lens 108 before it is input to a CCD image sensor section 109 (hereinafter referred to as a "CCD").

Subsequently, an image signal input to the printer section 2 is converted to a modulated light signal by an exposure control section 201 to illuminate a photosensitive member 202. As a result of this illumination, a latent image is formed on the photosensitive member 202, which latent image is developed by a developer unit 203. Timed to the leading edge of the developed image, a sheet of transfer paper is fed from a transfer stacking section 204 or 205, and the developed image is transferred to the sheet at a transfer section 206.

The transferred image is fixed to the transfer paper in a fixing section 207, and discharged to the exterior of the device from a paper discharge section 208 when a sorter 220 is performing a sorting function, the sheets of transfer paper output from the paper discharge section 208 are discharged to different bins. When the sorting function is not being performed, the sheets are output to the uppermost bin of the sorter.

When two consecutively read images are to be respectively output to both sides of a sheet of output paper, the first image is fixed to a sheet of output paper in the fixing section 207, and then this sheet is conveyed to the paper discharge section 208. After this, the paper conveying direction is inverted to convey the sheet to a transfer paper stacking section for re-feeding 210 through a conveying direction switching member 209. Then, the image of the next document, i.e., the second image, is read by the same process as described above, and transferred to the other side of the same sheet, which is fed from the transfer paper stacking section for re-feeding 210, with the result that the images of the two documents are respectively output to the first and second sides of a sheet of output paper.

The external apparatus 3 is connected to the reader section 1 through a cable, and the control of signals and various functions is effected by the core section in the external apparatus 3.

The external apparatus 3 includes the facsimile section 4 for facsimile transmission/reception, the file section 5 for converting the information of various documents into electrical signals and storing the information on a magneto-optic disk (the external storage device 6), the formatter section 8 for developing coded information supplied from the computer into image information, the computer interface section 7 serving as an interface between the computer and the apparatus, the image memory section 9 for storing information from the reader section 1 and temporarily storing information transmitted from the computer, the core section 10 for controlling the various functions mentioned above, etc.

Figure 3:
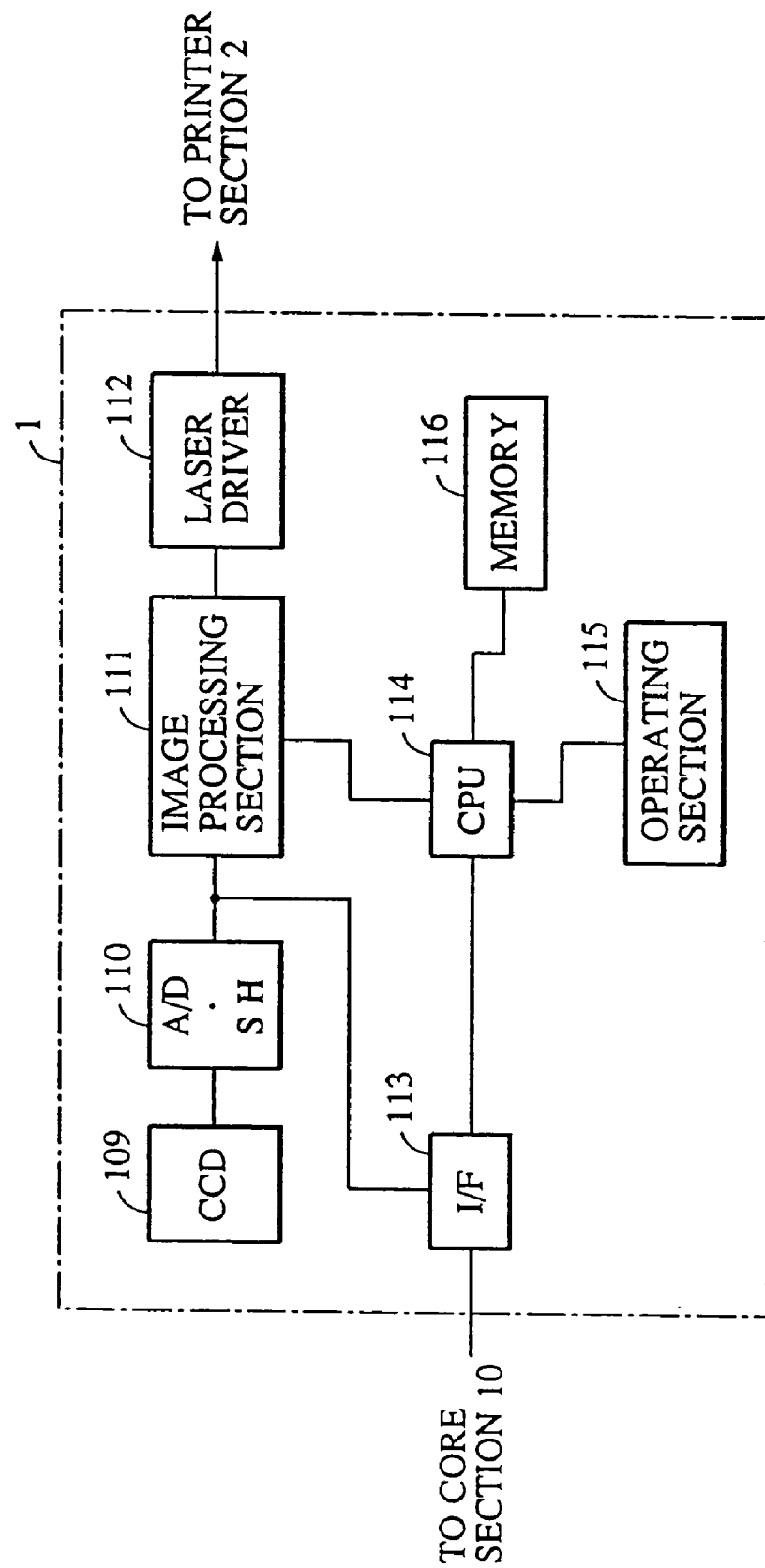
FIG. 3 is a block diagram showing the control system of a reader section in the first embodiment.

FIG. 3 is a block diagram schematically illustrating the control system of the reader section 1.

The reader section 1 includes an A/D·SH section 110 for performing A/D conversion and shading compensation on the signals read by the CCD 109, an image processing section 111 for inputting image data from the A/D·SH section 110 to perform various signal processing operations, such as color detection and contour processing, and a laser driver 112 for generating laser driving signals based on the image data from the image processing section 111 and supplying them to the printer section 2.

The reader section 1 further includes an interface section 113 for the input/output of various signals between the reader section 1 and the above-described external apparatus 3. Image data supplied from the external apparatus 3 through the interface section 113 can be transferred to the printer section 2 through the image processing section 111 and the laser driver 112.

The reader section 1 further includes an operating section 115 for performing various setting operations with respect to this system.

The reader section 1, constructed as described above, is controlled by the CPU 114 in accordance with a program stored in the memory 116. Apart from the program for controlling the CPU 114, the memory 116 is provided with storage areas for various items of data, for example.

Figure 4:
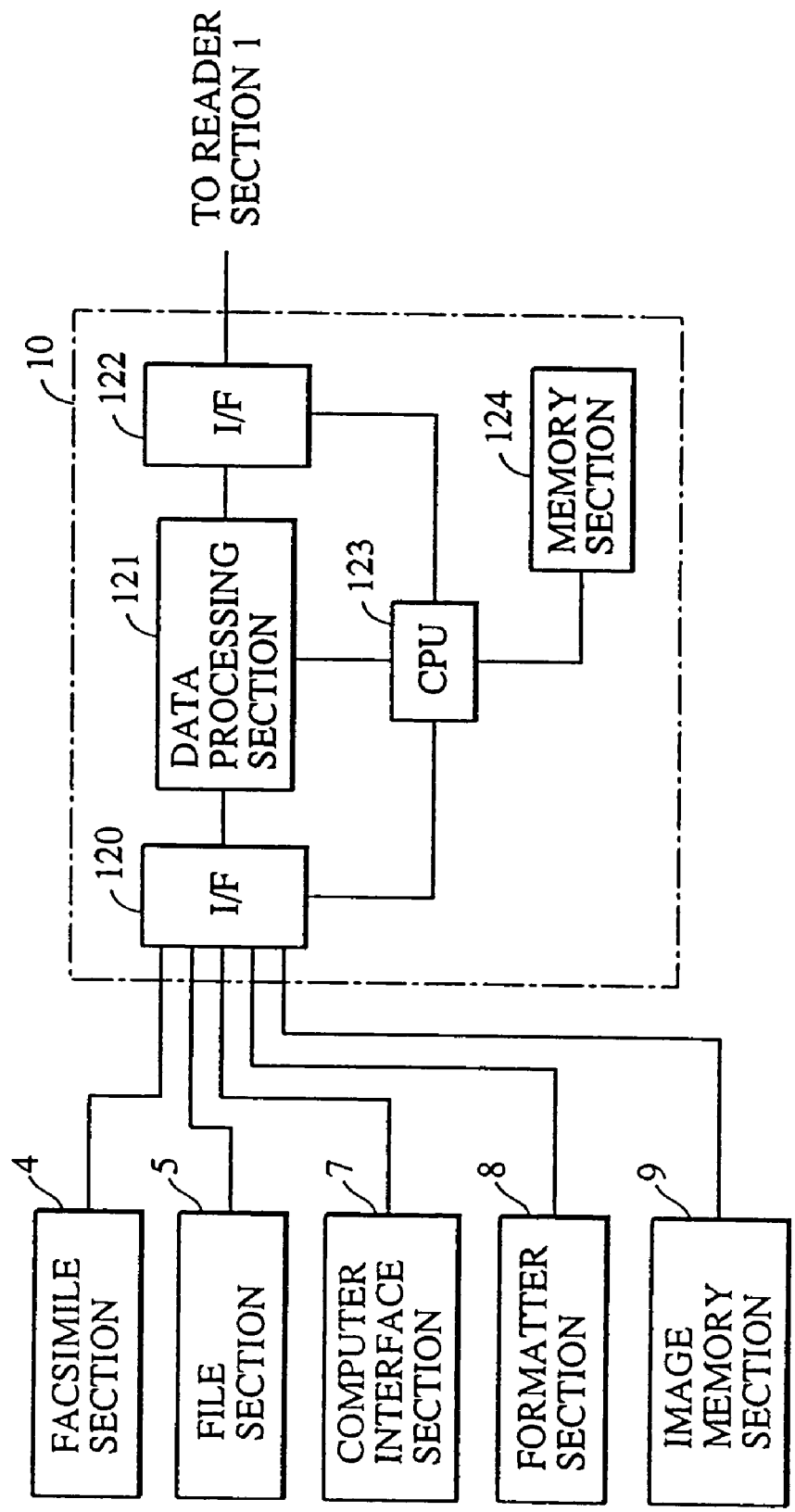
FIG. 4 is a block diagram showing the control system of a core section in the first embodiment.

FIG. 4 is a block diagram schematically showing the control system of the core section 10.

As shown in the drawing, the core section 10 includes: an interface section 120 having the function of a selector for connecting the facsimile section 4, the file section 5, the computer interface section 7, the formatter section 8, the image memory 9, etc.; a data processing section 121 for performing various functions regarding input data, such as scaling and rotation; and an interface section 122 for the input and output of various items of data to and from the reader section 1.

The core section 10 is controlled by a CPU 123 in accordance with a program stored in a memory 124. Apart from the control program for the CPU 123, the memory 124 is provided with storage areas for various kinds of data.

Next, a processing method using an image output job file, which constitutes a feature of the present invention, will be described.

First, image data read from the reader 1 beforehand is stored on a magneto-optical disk in the external storage device 6. When this storage has been completed, the magneto-optical disk is ejected from the external storage device 6 and kept appropriately.

Next, the operation performed when an image stored in the magneto-optical disk is to be output by utilizing the image output job file will be described.

Figure 7:
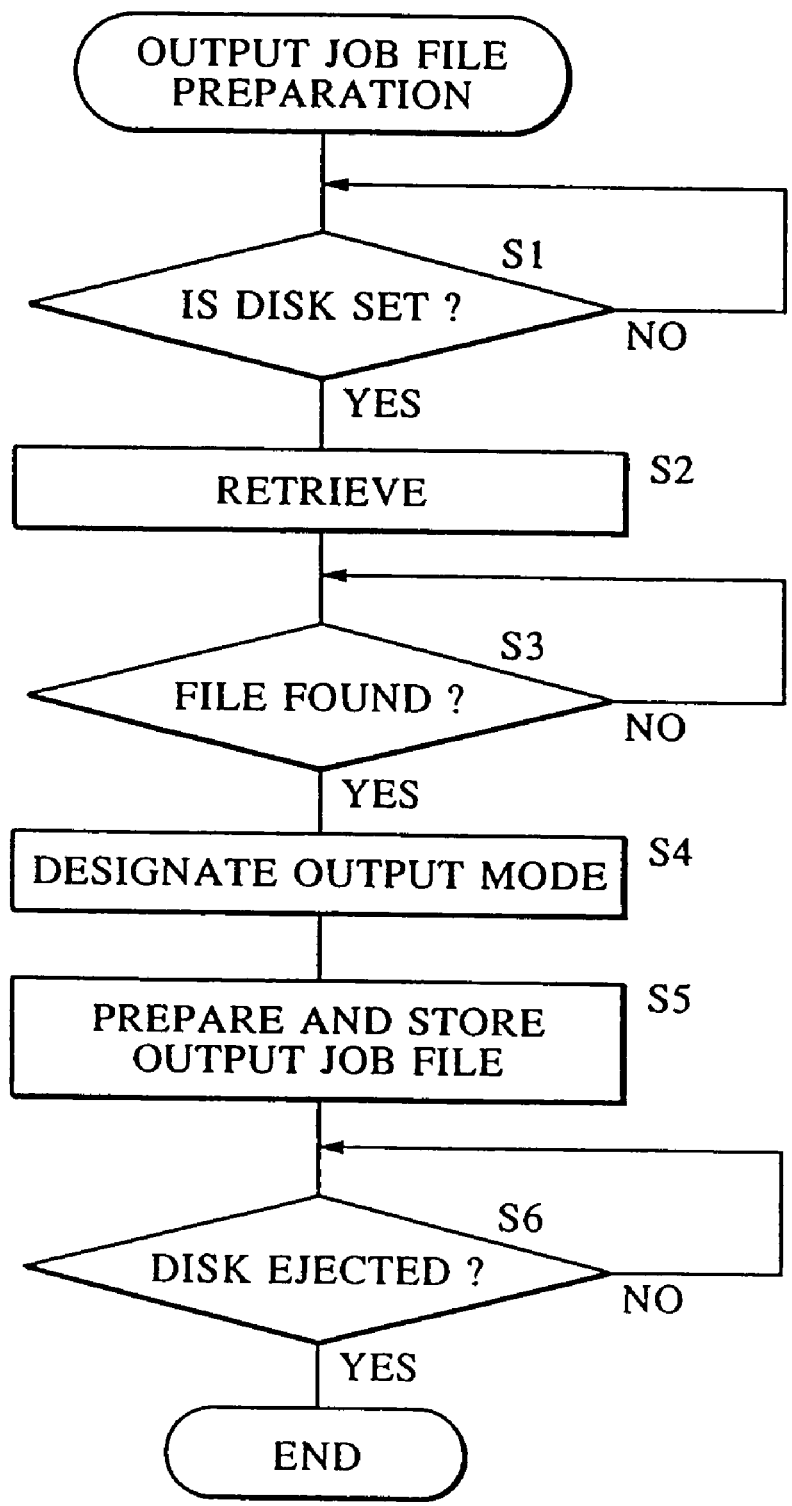
FIG. 7 is a flowchart illustrating a process for preparing an image output job file in the first embodiment.
Figure 9:
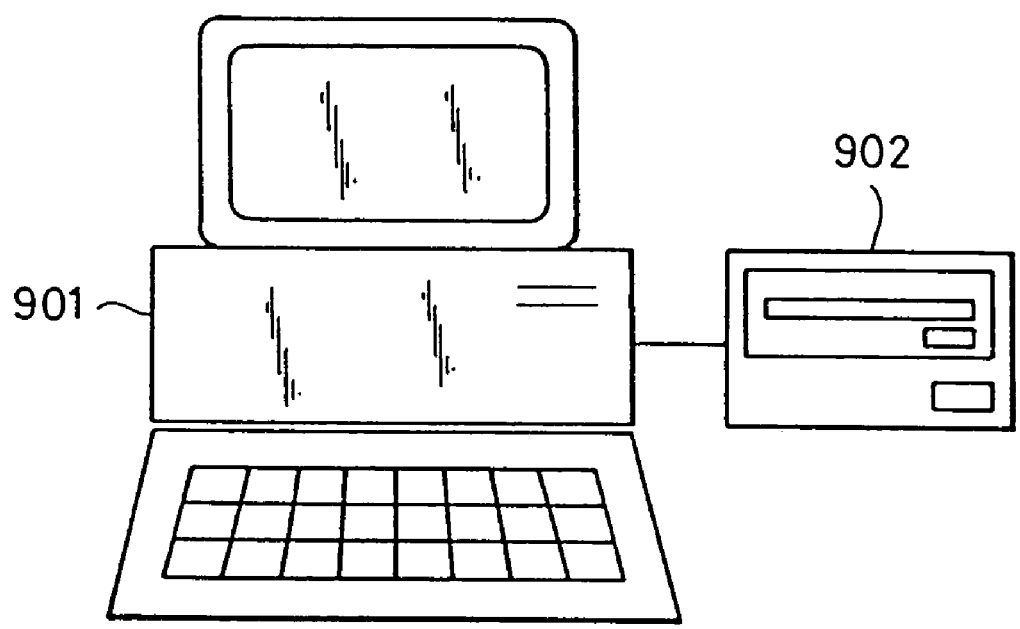
FIG. 9 is a front view showing computer equipment independent of an external device in the first embodiment, as well as an external storage device.

FIG. 7 is a flowchart illustrating the processing to be executed when preparing an image output job file. Computer equipment 901 and an external storage device 902, shown in FIG. 9, are apparatuses independent of the external apparatus 3.

First, the magneto-optical disk is inserted into the external storage device 902 connected to the computer equipment 901 (S1), and the data base file prepared on the magneto-optical disk is read from the application software of the computer equipment 901, thereby retrieving for the desired image file (S2).

When the desired image file is found (S3), an output mode is designated, as shown in FIG. 5 (S4). As the output mode, it is possible to designate, for example, the number of output copies, the number of output pages, output paper size, double-sided output, sorting or stapling. These output modes are stored on the magneto-optical disk as an output job file together with a unique file number specifying the image file (S5).

FIG. 6 is an explanatory drawing showing an example of the contents of an output job file. As shown in the drawing, it is possible to register a plurality of output jobs. Further, the job contents allow alteration, such as erasing and addition.

When the registration of the desired jobs has been completed, the magneto-optical disk is ejected from the external storage device 902 (S6).

As described above, the registration of output jobs can be made on a disk-to-disk basis.

Figure 8:
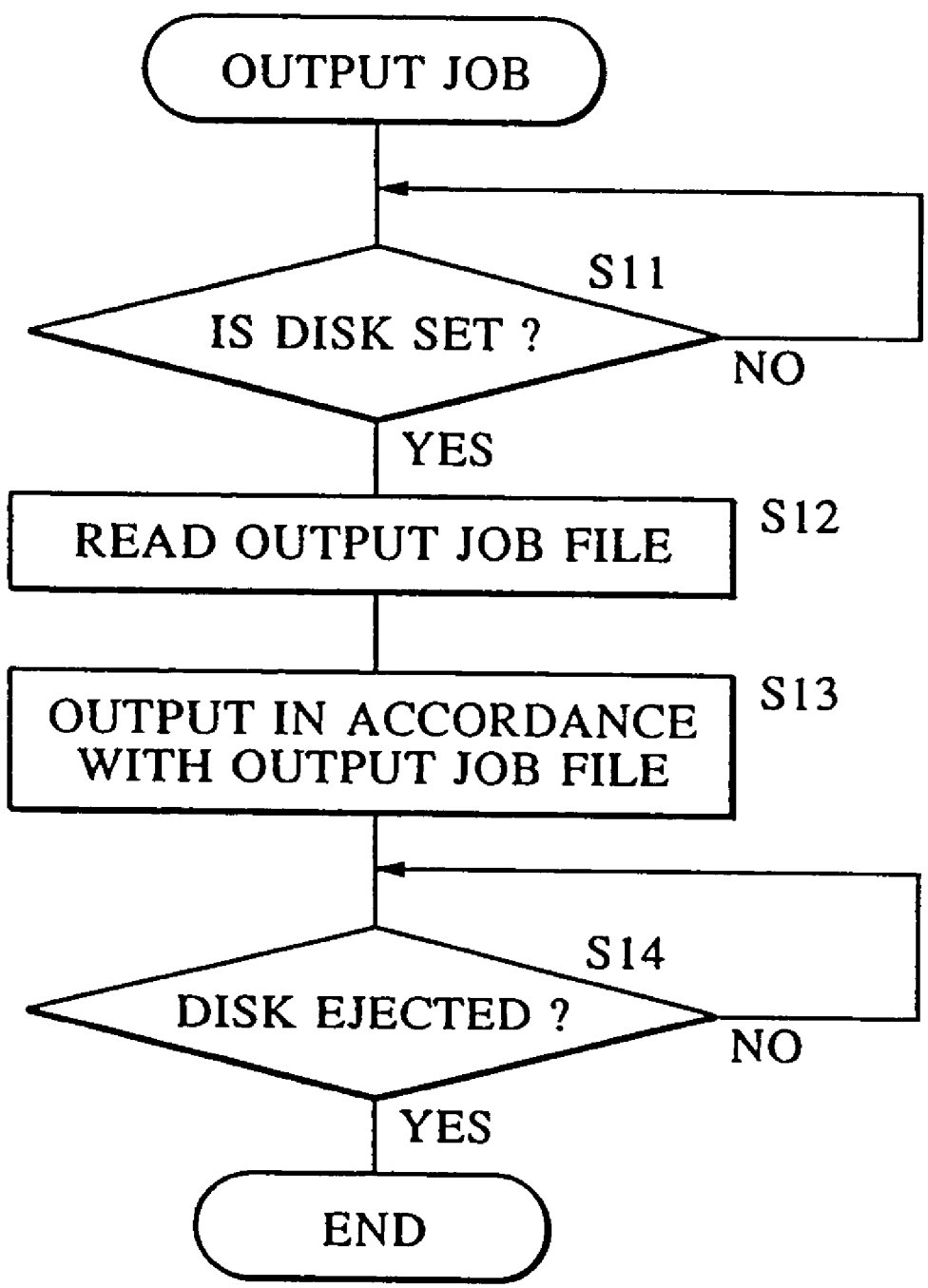
FIG. 8 is a flowchart illustrating the operation to be performed when the image output job file of the first embodiment is used.

Next, FIG. 8 is a flowchart showing the operation of a process when using an image output job file.

First, a magneto-optical disk on which output jobs have been registered in the manner described above is inserted into the external storage device 6 (S11). A CPU (not shown) in the file section detects via an SCSI controller (not shown) that the magneto-optic disc has been inserted into the external storage device 6, and reads the output job file (S12). Then, in accordance with the contents of the output job file thus read, processing is performed with respect to an image file registered in an output job out of the image data stored on the magneto-optical disk (S13).

The operation will be described with reference to the output job file shown in FIG. 6. First, the first output job registered, i.e., the image file having the name of a document: "minutes", is output. The image file of the "minutes" is identified by the unique file number mentioned above. In this case, the paper size corresponding to the case when all the pages (10 pages) are recorded is selected to effect double-sided printing, and five copies of the document are output in the stapled/sorted form. The other output jobs are sequentially processed in a similar manner.

As shown in FIG. 6, each of the output jobs is registered in the output job file in such a way as to indicate the status (processing condition) thereof.

Apart from the output job file, it is also possible to write a log file to the magneto-optical disk. The data to be written may consist, for example, of the registration data/time of the output job, the execution data/time of the output job, or the job status. The job status to be written may be "unprocessed", "in execution", "paper jammed", "normally ended", etc.

When the size of the output job file is limited, it is possible for the output jobs to be deleted from the output job file one by one as soon as they are normally ended. Further, after writing the status, the magneto-optical disk may be automatically ejected.

In the output job file of FIG. 6, it is also possible to register a plurality of image files under one job number. In this case, the job number is designated from the operating section 115 after the magneto-optical disk is inserted into the external storage device 6, and image data corresponding to the designated job number is output in accordance with the designated output mode of the output job file.

As described above, the output job is registered on the computer equipment side, and output control is effected by the compound image input/output apparatus with reference to the output job, whereby the computer equipment need not wait until the termination of the output. Further, by effecting a compression/expansion of image data by the compound image input/output apparatus, high-speed image output is possible, thereby achieving an improvement in operational efficiency.

Next, a facsimile transmission processing method using an image transmission job file, which constitutes a second embodiment of the present invention, will be described.

First, when preparing an image transmission job file, a magneto-optical disk on which a desired image file has been stored beforehand is inserted into the external storage device 902, which is connected to the computer equipment 901, and the desired image file is searched for by reading the data base file prepared on the magneto-optical disk from the application software of the computer equipment 901.

When the desired image file is found, a transmission mode is designated. The transmission mode that can be designated may, for example, be the telephone number of the destination of transmission, the resolution in transmission, ECM, or polling. These transmission modes only differ in items from those used in printing out, so that they can be stored on the magneto-optical disk in completely the same way as in the case of printing out as a transmission job file.

Next, when the magneto-optical disk on which the transmission job has been registered is inserted into the external storage device 6, the CPU of the file section 5 detects, via the SCSI controller, that the magneto-optical disk has been inserted into the external storage device 6, and reads the transmission job file. In this case also, the transmission jobs are sequentially facsimile-transmitted, starting from the first transmission job registered in the transmission job file, as in the case of printing out.

Each transmission job registered is given in the transmission job file in such a manner that its job status can be checked. Further, apart from the transmission job file, it is also possible to write a log file to the magneto-optical disk. The data to be written may, for example, be the date/time of registration of the transmission job, the date/time of execution of the output job, the job status, etc. The job status to be written may, for example, be "unprocessed", "in execution", "communication error occurred", "normally ended", etc. When the size of the transmission job file is limited, the transmission jobs may be deleted one by one from the transmission job file as soon as they are ended.

As described above, transmission jobs are registered on the computer equipment side, and transmission control is effected in the compound image input/output apparatus with reference to the transmission jobs, whereby the computer equipment need not wait until the termination of transmission. Further, since a compression/expansion of image data is effected by the compound image input/output apparatus, high-speed image transmission is possible, thereby achieving an improvement in operational efficiency. Further, when in conventional facsimile apparatuses communication management reports are output to paper, it is possible, in this invention, for such reports to be given through the display of a personal computer.

As described above, in accordance with the present invention, an image output job file or an image transmission job file stored in an image output job storage means or image transmission job storage means can be written and read to and from computer equipment, whereby the users are able to distributively perform searching and stock processing of image output jobs or image transmission jobs by using a plurality of computer equipment for each storage medium. Further, on the computer equipment side, transition to another operation can be quickly effected after the registration of image output jobs, image transmission jobs or the like, thereby achieving an improvement in operational efficiency.

Further, image data coding/decoding conversion processing, associated with image output processing, image transmission processing or the like, is managed on the compound image input/output apparatus side, whereby it is possible to restrain an unnecessary increase in cost on the computer equipment side.

Further, regarding the setting of various output modes, it is possible to effectively utilize the various resources in the compound image input/output apparatus, whereby it is possible to easily provide a man-to-machine interface (MMI) having a better operability than the operating panel of the main body of the copying machine on the application side of the computer equipment.

Except as otherwise disclosed herein, the various components shown in outline or in block form in the figures are individually well known and their internal construction and operation are not critical either to the making or using of this invention or to a description of the best mode of the invention.

Although the present invention has been described with reference to preferred embodiments, the present invention is not restricted to these embodiments, and various modifications are possible without departing from the scope of the invention as defined in the claims.

What is claimed is:

1. An image processing apparatus comprising:
a printer adapted to print an image on a recording medium based on an image data file;
a loading unit adapted to receive a detachable storage medium, the detachable storage medium having stored therein (i) a plurality of image data files corresponding to images to be printed by said printer and (ii) information indicating a print setting for at least one of the image data files; and
a controller adapted to control said printer so as to print an image on a recording medium based on the image data file corresponding to that image stored in the detachable storage medium in accordance with the information indicating the print setting, without manual designation of the image data file to be printed after the detachable storage medium is loaded in said loading unit.

2. An apparatus according to claim 1, wherein said controller writes information indicating a print result to the detachable storage medium.

3. An apparatus according to claim 1, wherein the information indicating the print setting includes a desired number of copies to be printed.

4. An apparatus according to claim 1, wherein the image data file stored in the detachable storage medium is obtained by capturing an image.

5. An apparatus according to claim 4, wherein the image data file is captured by reading the image on a document.

6. A method for processing an image comprising the steps of:
loading a detachable storage medium into a loading unit of an image processing apparatus, the detachable storage medium having stored therein (i) a plurality of image data files corresponding to images to be printed on recording sheets and (ii) information indicating a print setting for at least one of the image data files;
printing an image on a recording sheet based on the image data file corresponding to that image stored in the detachable storage medium loaded in the loading unit; and
controlling the printing step in accordance with the information stored with the corresponding image data file in the detachable storage medium loaded in the loading unit, without manual designation of the image data file.

7. A method according to claim 6, wherein the controlling step is performed to write information indicating a print result to the detachable storage medium.

8. A method according to claim 6, wherein the information stored in the detachable storage medium indicates a desired number of copies to be printed.

9. A method according to claim 6, wherein the image data file is obtained by capturing an image.

10. A method according to claim 9, wherein the captured image is obtained by reading an image on a document.

11. A recoding media having recorded therein computer readable code for executing the steps of:
reading from a detachable storage medium loaded into a loading unit of an image processing apparatus (i) one of a plurality of image data files corresponding to images to be printed on recording sheets and (ii) information indicating a print setting for at least one of the image data files;
printing an image on a recording sheet based on the image data file corresponding to that image stored in the detachable storage medium and read in the reading step; and
controlling the printing so as to print an image on the recording sheet in accordance with said information read from the detachable storage medium loaded in the loading unit, without manual designation of the image data file to be read.

12. A recording media according to claim 11, wherein said information indicates a print result to the detachable storage medium.

13. A recording media according to claim 11, wherein said information indicates a desired number of copies to be printed.

14. A recording media according to claim 11, wherein the image data file is obtained by capturing an image.

15. A recording media according to claim 14, wherein the captured image is obtained by reading an image on a document.

* * * * *

UNITED STATES PATENT AND TRADEMARK OFFICE
CERTIFICATE OF CORRECTION

PATENT NO. : 7,095,525 B2 Page 1 of 1
APPLICATION NO. : 10/892084
DATED : August 22, 2006
INVENTOR(S) : Hirohiko Itoh It is certified that error appears in the above-identified patent and that said Letters Patent is hereby corrected as shown below:

COLUMN 3

Line 59, "section 208 when" should read --section 208. When--.

Signed and Sealed this

Thirteenth Day of March, 2007

JON W. DUDAS
*Director of the United States Patent and Trademark Office*